United States Patent [19]

Pelkey

[11] Patent Number: 4,985,895
[45] Date of Patent: Jan. 15, 1991

[54] REMOTE CONTROLLED RECEIVING SYSTEM APPARATUS AND METHOD

[75] Inventor: Gary L. Pelkey, Woodstock, Ga.

[73] Assignee: Wegener Communications, Inc., Duluth, Ga.

[21] Appl. No.: 270,143

[22] Filed: Nov. 14, 1988

[51] Int. Cl.[5] .................. G06F 11/10; G08C 19/00
[52] U.S. Cl. ......................... 371/37.7; 340/825.73; 455/53
[58] Field of Search .............. 371/32, 37.1, 40.1, 371/50.1, 37.7; 340/825.07, 825.72, 825.73; 455/49, 53, 57

[56] References Cited

U.S. PATENT DOCUMENTS

| | | | |
|---|---|---|---|
| 4,160,238 | 7/1979 | Weckenmann et al. | 340/825.07 |
| 4,277,844 | 7/1981 | Hancock et al. | 371/50.1 |
| 4,430,652 | 2/1984 | Rothenbuhler et al. | 340/825.72 |
| 4,528,656 | 7/1985 | Morais | 340/825.73 |
| 4,535,333 | 8/1985 | Twardowski | 340/825.72 |
| 4,660,215 | 4/1987 | Horiike et al. | 375/48 |
| 4,712,214 | 12/1987 | Meltzer et al. | 371/32 |

Primary Examiner—Charles E. Atkinson
Attorney, Agent, or Firm—Jones, Askew & Lunsford

[57] ABSTRACT

A point to multipoint has a single transmission device and multiple remotely located receivers. Each remote receiver receives a transmitted signal via a satellite and extracts information in the form of data bytes. A microprocessor assemblies and interprets the data bytes according to a predefined protocol and then executes the desired action by affecting an appropriate device. The protocol enables the transmitter to direct commands to some sets of remote receivers other than all of the remote receivers and can switch channels and frequency at will to improve flexibility and security. The protocol defines a special way of packeting asychronously encoded bytes of data so that common software in remote receiving units may detect packet boundaries, detect one or two bit errors in a packet and correct single bit errors. The common software may also determine if a packet is targeted or addressed to the remote and may parse and execute the implied command of the packet. The length of a packet frame varies from a minimum of seventeen bytes to a practical maximum of two hundred fifty bytes. There are nine data fields in each frame that contain identification, data and command istructions.

20 Claims, 8 Drawing Sheets

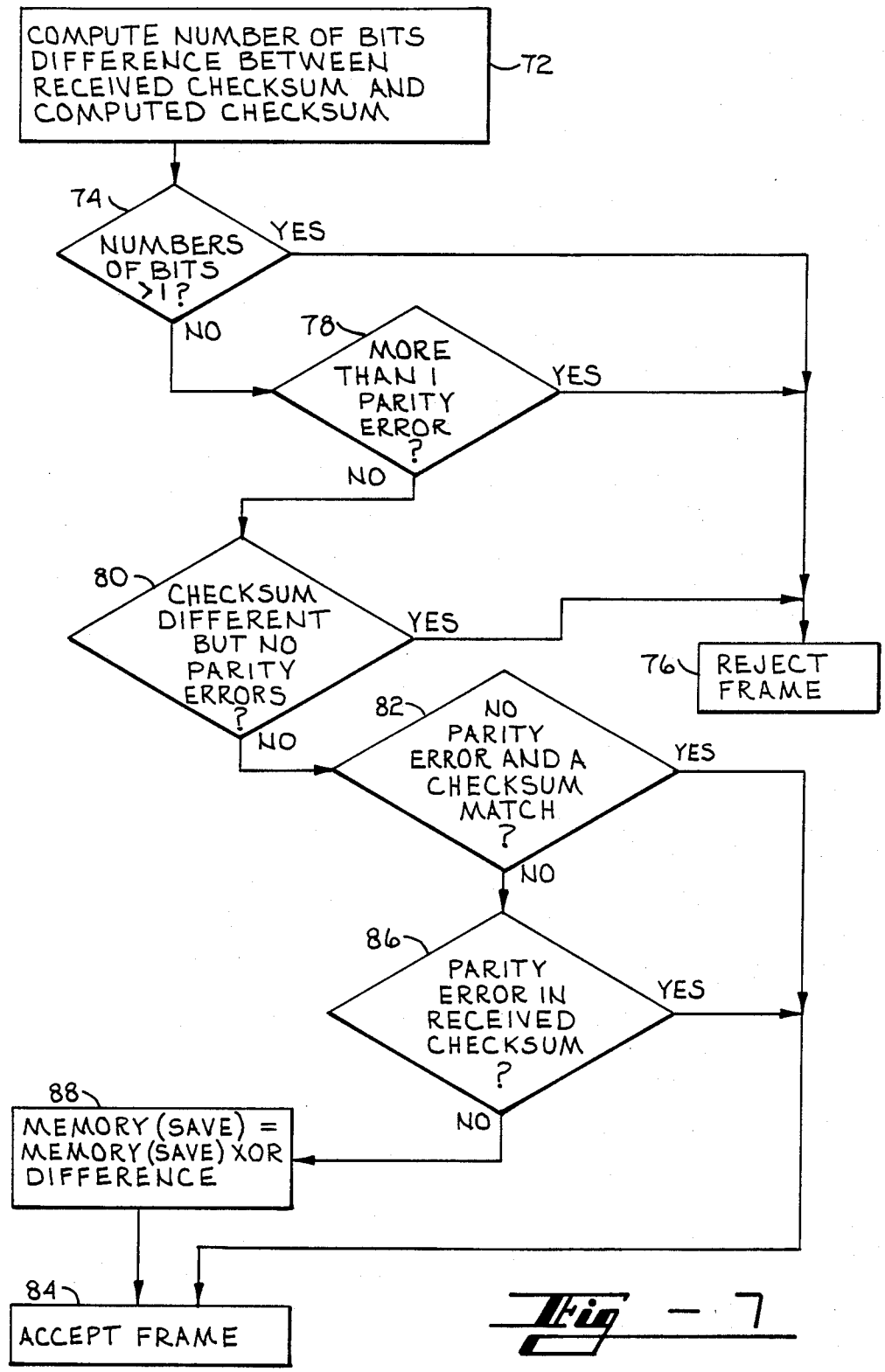

REMOTE CONTROLLED RECEIVING SYSTEM APPARATUS AND METHOD

TECHNICAL FIELD

This invention relates generally to satellite communication systems, and more particularly relates to a point to multipoint network having a single transmission device and multiple remotely located receivers.

BACKGROUND OF THE INVENTION

A communication satellite makes possible the existence of large networks of communication equipment that can span a wide geographical area. One type of satellite communication system is a point to multipoint configuration wherein equipment at a single location, termed the uplink, may send data, control information, audio and video signals to hundreds or even thousands of individual locations, called downlinks. The downlinks are receiving stations and may be geographically positioned over the entire country or any other geographic area. The data and signals from the uplink are transmitted via satellite to the downlinks virtually immediately. These point to multipoint communications networks have a variety of uses such as simultaneously switching audio and video programming as in a cable television network, sending electronic mail, or controlling equipment at physically remote outposts, as well as many other applications.

Some point to multipoint systems, once established, are inflexible and cannot accommodate new equipment types without modification to the arrangement of data and control signals. Also, some systems are intolerant to transmission errors and are susceptible to giving the wrong information or output when an error occurs. Another difficulty with some systems is the inability of the uplink to direct commands to a set of the remote downlinks other than all of the downlinks. It will be appreciated that it will be highly desirable for the uplink to direct a command to an individual downlink.

In addition, there are various simple and tiered schemes for grouping the downlinks. Most of these schemes, however, rely upon the uplink to remember the group membership and simply broadcast a list of individual identifiers with a command when group addressing is desired. Accordingly, it will be appreciated that it would be highly desirable to have an addressable system wherein the downlinks only respond to data intended for them.

SUMMARY OF THE INVENTION

The present invention is directed to overcoming one or more of the problems set forth above. Briefly summarized, a remote receiver receives a transmitted control data signal from a transmitter via a satellite and extracts information in the form of data bytes. A microprocessor assembles and interprets the data bytes according to a predefined protocol and then executes the desired action by affecting an appropriate device. The transmission protocol facilitates control of large numbers of like equipment in a point to multipoint satellite network such as radios, video switches, printers, and other equipment. The transmission protocol is flexible enough to expand to control new types of equipment, provide some measure of error detection and correction at low cost and provide extremely fine control with regard to the addressability of the remote equipment.

Accordingly, it is an object of the present invention to accommodate new equipment types without modification to the protocol so that the controlling software in the satellite uplink site and the remote receiver sites can be easily adapted to control the new equipment.

Another object of the present invention is to enable the remote receiver to tolerate transmission errors in such a manner that the probability of the wrong action taking place is very low, and the probability of the correct action taking place is very high. These are commonly referred to as error detection and error correction respectively and are attributes of the present invention.

Still another object of the present invention is to provide the uplink with the ability to direct commands to some sets of remote receivers other than all of the remote receivers. Since the uplink is in effect broadcasting every command, addressing all remote receivers is trivial. The minimum for an addressable system is directing a command to an individual remote receiver. There are also various simple and tiered schemes for grouping the remote receivers. In contrast to the present invention, however, most of these schemes rely upon the uplink to remember group membership and simply broadcast a list of individual identifiers with a command when group addressing is desired. The present invention has the unique ability to direct commands to some set of remotes other than all of the remotes and can switch channels and frequency at will to improve flexibility and security.

These and other objects, features, and advantages of the present invention will be more clearly understood and appreciated from a review of the following detailed description of the preferred embodiments and by reference to the accompanying drawing and claims.

BRIEF DESCRIPTION OF THE DRAWINGS

FIG. 6 is a schematic block diagram illustrating bit error processing wherein the protocol of the present invention allows identification of a bit error on both a horizontal and a vertical basis as viewed in the diagram.

FIG. 7 is a flow chart illustrating an error correction algorithm portion of an interrupt service routine for the preferred embodiment of the receiver illustrated in FIG. 4.

DETAILED DESCRIPTION OF THE PREFERRED EMBODIMENTS

Figure 1:
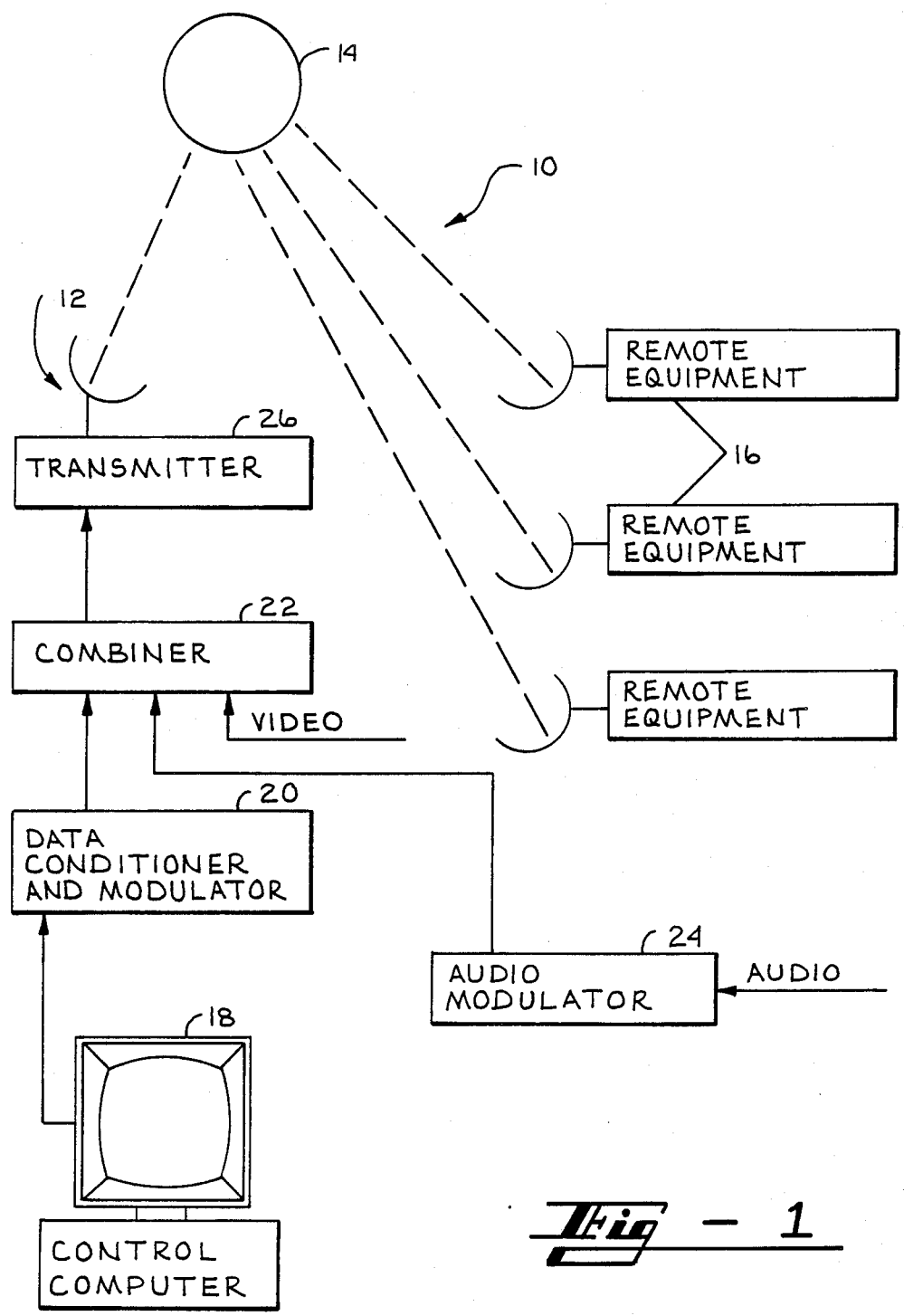
FIG. 1 is a block diagram of a preferred embodiment of a point to multipoint satellite network illustrating a transmission uplink, a satellite and several remote receiver downlinks.

Referring now to the drawings, in which like numerals indicate like elements throughout the several figures, FIG. 1 illustrates a typical satellite point to multipoint network wherein the point is referred to as the uplink and the multipoints are called downlinks with the equipment at each downlink referred to as remote equipment, or simply a remote. In the satellite control network 10, control information is generated at the uplink 12 and transmitted via the satellite 14 to the downlinks 16. Control information is preferably generated at the uplink 12 by a control computer 18, fed to various conditioning and modulation circuits 20 and combined with other signals in a combiner 22. These other signals may be video signals or audio signals fed through an audio modulator 24 to the combiner 22. These combined signals are transmitted by a transmitter 26 to a particular satellite on a particular frequency. The transmitted signal is retransmitted by the satellite 14 back to locations within a particular geographic footprint area. Devices in this area, using the appropriate receive antenna and other equipment, may reconstitute and use the transmitted signal or signals. Using multiple satellites enables the signals to be retransmitted to any desired geographic areas.

Figure 2:
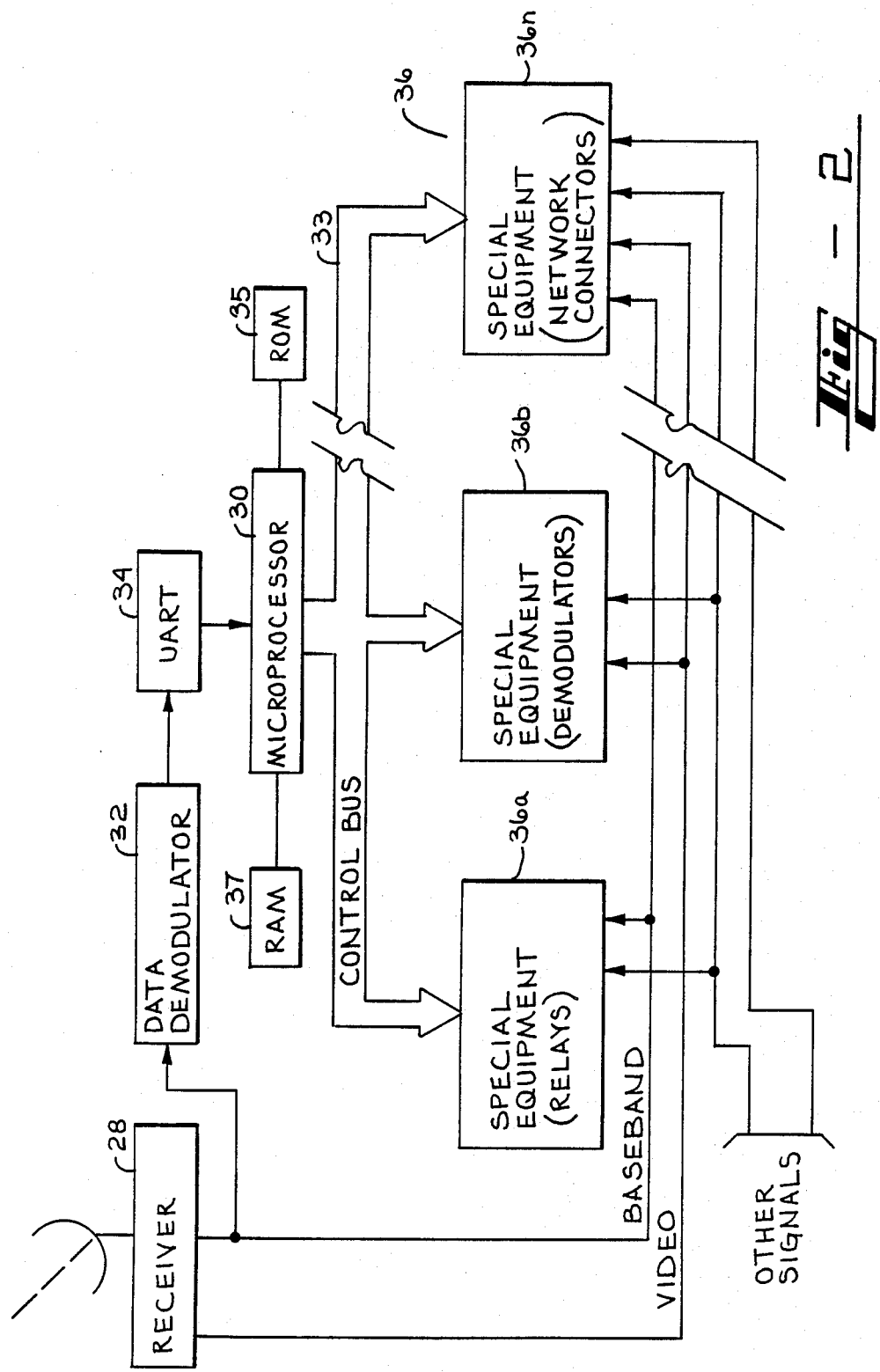
FIG. 2 is a block diagram of the preferred embodiment of a typical remote receiving unit illustrated in FIG. 1.

Referring to FIG. 2, a typical block diagram of a remote network receiving unit is shown that includes a receiver 28 that demodulates the received signal and outputs video and baseband signals. The baseband signal can contain various audio and data signals. The receiver 28 may or may not be an inherent part of the remaining remote equipment.

As the type and content of the control information exceeds a certain complexity, it becomes necessary to include a microprocessor 30 at each remote site to parse and execute the control functions. The control data signal is extracted from the baseband signal via the data demodulator 32. The type of demodulator 32 used is chosen to match the type of modulator 20 used at the uplink 12. The control information can be in a synchronous format or an asynchronous format. When the control information is in an asychronous format, the unit must contain some sort of UART device 34, as shown, to reassemble the data bytes. Various synchronous formats also exist that require other types of hardware to perform this reassembly process.

After demodulation and any necessary reassembly, the data bytes are then passed to the microprocessor 30 which assembles and interprets the data bytes according to a predefined protocol. The microprocessor then executes the desired action by affecting a device 36 attached to its input/output or data bus 33. Appropriate ROM 35 and RAM 37 memories are associated with the microprocessor to accomplish the desired action and affect the device or devices 36 attached to the bus 33. Typical devices 36 that can be connected to the bus 33 include special equipment such as relays 36a, audio or data demodulators 36b, printers 36c (not shown), or network connection ("NETCON") devices 36n. Special devices can also include attenuators, UARTS, frequency synthesizers, and other communications equipment.

Figure 4:
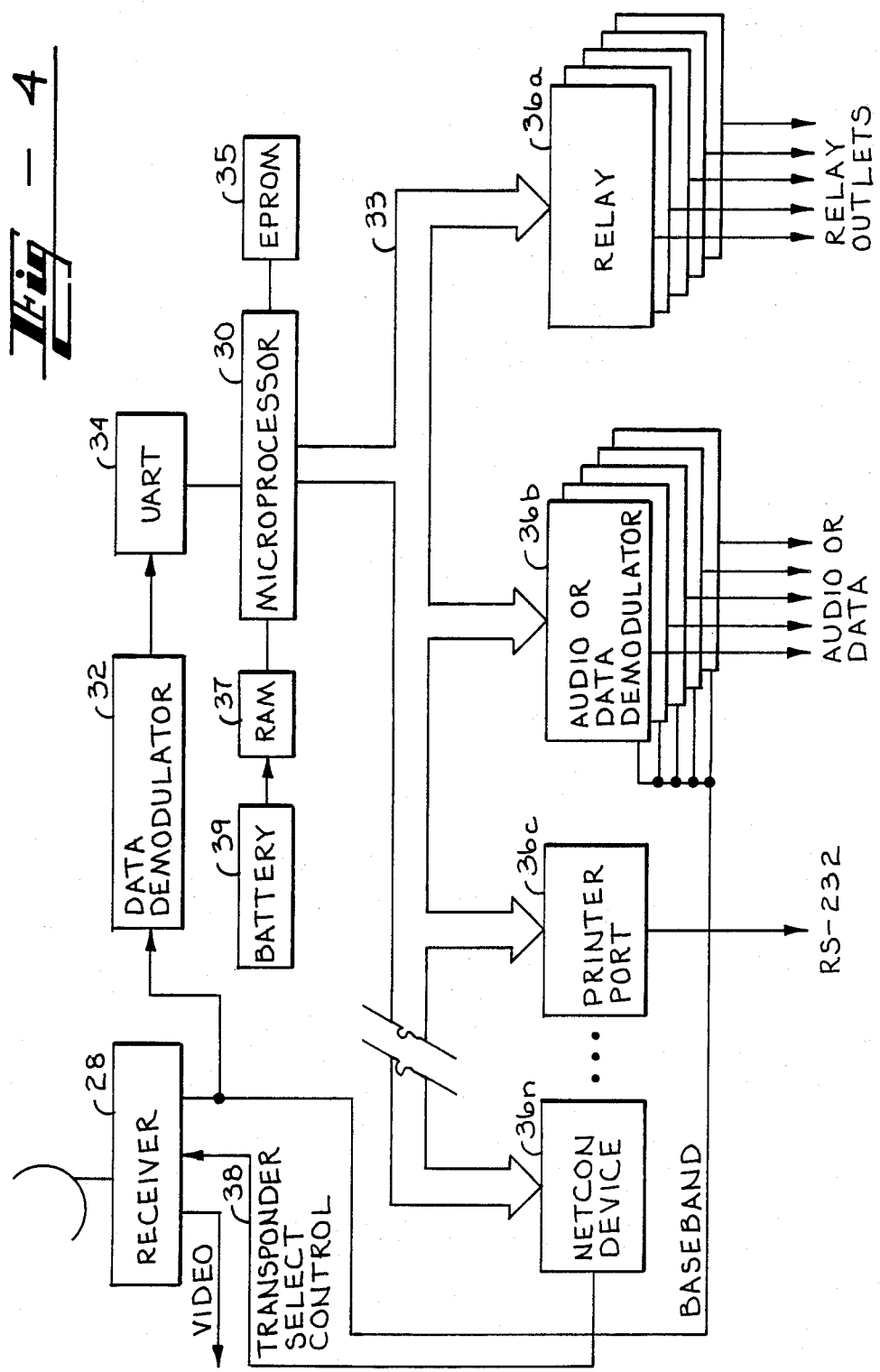
FIG. 4 is a block diagram of another preferred embodiment of a remote receiver.

Referring to FIG. 4, which is a block diagram of another preferred embodiment of a remote receiver, the NETCON device 36n is shown connected to the bus 33 and to the receiver 28 via transponder select control line 38. In FIG. 4, a memory power backup battery 39 is included and is shown connected to the RAM 37 which is preferably a 6164. Preferably, the microprocessor 30 is a Z80 microprocessor and the UART 34 is a Z80-SIO. The ROM 35 is preferably an EPROM type 27C64.

The NETCON device 36n illustrated in FIG. 4 is not necessarily a separate physical device but may be a group of software routines that accomplish certain functions and housekeeping tasks. The functions and housekeeping tasks include all of the group management commands such as add to a group, delete from a group, and delete from all groups. These also include any commands related to the reception of data by the microprocessor 30, such as transponder selection control, for example.

Figure 3:
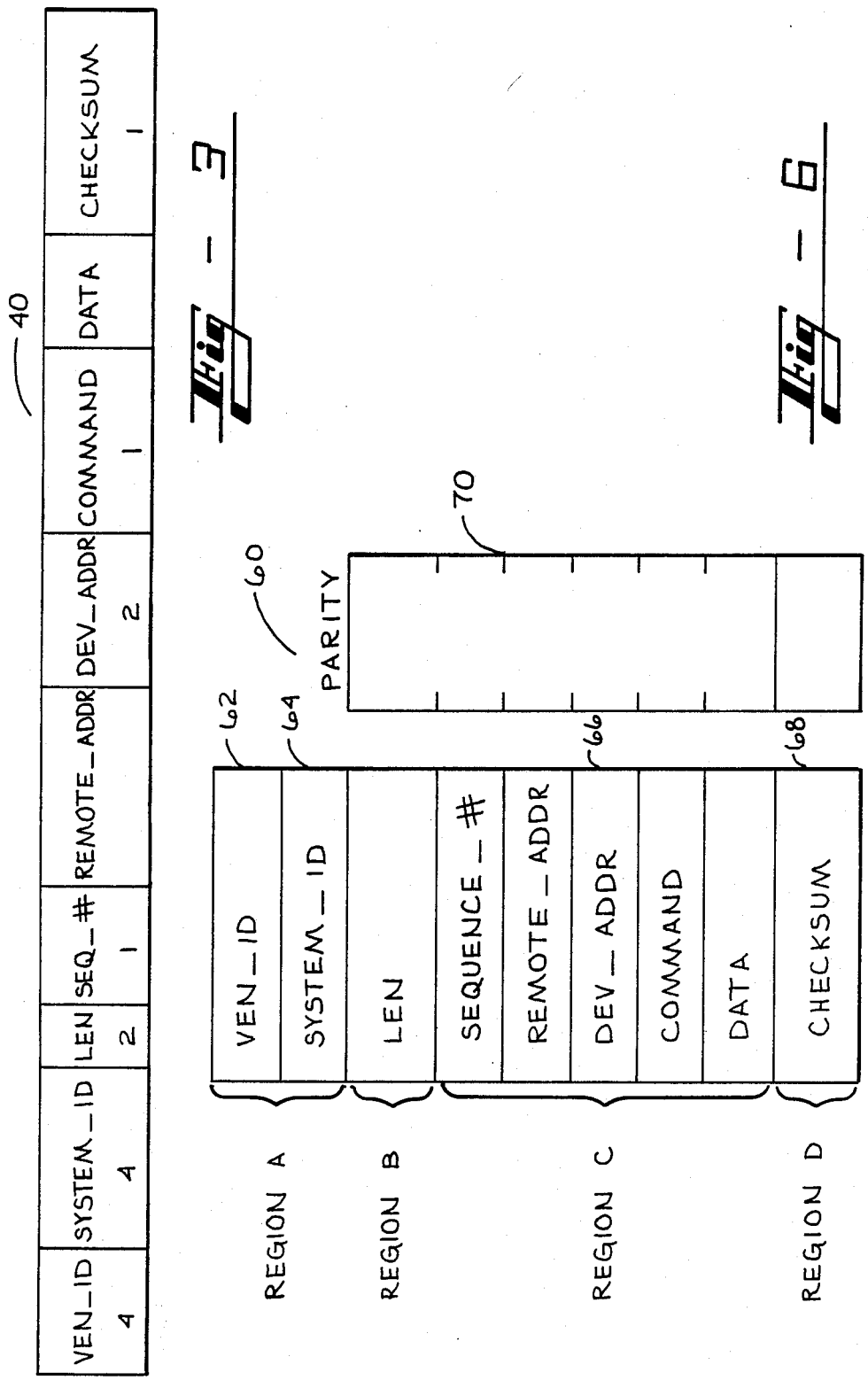
FIG. 3 is an illustration of the preferred embodiment of the general frame structure utilized by the equipment illustrated in FIGS. 1 and 2.

Referring now to FIG. 3, which is an illustration of the general frame structure utilized by the preferred embodiment, the present invention includes a protocol that defines a special way of packeting asynchronously encoded bytes of data so that common software in remote receiving units may detect packet boundaries, detect one or two bit errors in a packet and correct single bit errors. The common software may also determine if a packet is targeted or addressed to the remote and may parse and execute the implied command of the packet. The protocol requires that the bytes be asynchronously encoded in the standard manner with start, stop, and parity bits transmitted with each group of eight data bits that comprise one data byte. This allows the data to be transmitted and received with a standard, low cost UART such as the Z80-SIO.

In satellite controlled data networks, the data is usually further encoded via FSK, BPSK, QPSK, or other well known modulation techniques. The encoded data then is typically transmitted as a subcarrier to a video transponder channel. The packet decoding steps required to decode the encoded data are complex enough to require an embedded microprocessor 30 in each remote 16. The transmission speed with the embedded microprocessor 30 is generally in the low to medium range up to about 64 kilobits per second or so. The formatted data has a baud rate that varies with each uplink, is asynchronously transmitted, contains eight data bits per byte, uses odd parity and one stop bit.

The general frame structure is illustrated in FIG. 3 wherein the length of a frame 40 varies from a minimum of seventeen bytes to a practical maximum of two hundred fifty bytes.

There are nine data fields in the frame 40 identified as vendor identification ("VEN-ID"), system identification ("SYSTEM-ID"), length indicator ("LEN"), sequence number ("SEQ-#"), remote address ("REMOTE-ADDR"), device address ("DEV-ADDR"), COMMAND, DATA, and CHECKSUM.

The data and REMOTE-ADDR fields are variable in length. The CHECKSUM, COMMAND, and SEQ-# fields are each one byte long while the LEN and DEV-ADDR fields are each two bytes long.

The VEN-ID and SYSTEM-ID are each four bytes long. The VEN-ID frame contains four bytes of equipment vendor identification. For example, for all equipment produced by Wegener Communications, Inc., 11350 Technology Circle, Duluth, Ga. 30136, the VEN-ID is a constant "WCI*". The VEN-ID is used for frame separation. The SYSTEM-ID is four bytes that are constant for every frame within one control system but that vary from system to system. For example, Bob's New Cable Data Service may use "BOBS". As the name implies, SYSTEM-ID is used for identification of the system.

When searching for the eight bytes that form the VEN-ID and SYSTEM-ID fields, the remote 16 is said to be in the hunt phase. To increase robustness, the remote 16 does not exit the hunt phase unless the received byte is more than one bit different from that expected. Robustness is the ability of the remote 16 to tolerate transmission errors. It is preferred that the remotes tolerate transmission errors in such a way that both the probability of the wrong action occurring at the remote is very low, and the probability of the correct action occurring is very high. These are referred to as error detection and correction, respectively.

The third field is LEN, the two byte length indicator that equals the total number of bytes in the SEQ-#, REMOTE-ADDR, DEV-ADDR, COMMAND and DATA fields. Any reception error in either byte of the LEN field causes the remote 16 to abort this frame and reenter the hunt phase.

The SEQ-# is a one byte frame numbered field that increments (and merely wraps back around to zero) for each new frame that is transmitted out of the control computer 18.

REMOTE-ADDR is a variable length field that ultimately specifies which remotes are to process the command frame. This field allows station, group, and all addressing modes to be used in various logical combinations. A sum of terms approach is taken in that a comma (,) is treated as a logical OR and a carat (∧) is treated as a logical AND. No parenthesis are allowed, and the ANDs are of higher priority than the ORs. The tilde (∼) is used as a logical NOT in front of any single group, individual or all entry and a period (.) will specify the end of the entire field. An all entry is specified by a single ASCII "A". An individual is specified by an ASCII "S" directly followed by from one up to six ASCII digits specifying the remote's serial number. A group entry is specified by a "G" followed by from one up to four digits specifying the group number with an upper limit depending on how many groups are supported.

In almost every case, the operator at the uplink will deal with the group and individual downlinks with mnemonic names, however, the uplink computer 18 will always translate these to numeric codes. As an example:

if REMOTE-ADDR="S123, G10∧∼G157." then, only remote number 123 and any remote that happened to be in group 10 while also not being in group 157 would process the command frame.

The DEVICE-ADDR frame field is a two byte field indicating the logical device at the downlink to which this command is directed. In the preferred embodiment of FIG. 4, the NETCON device 36n is logical device number one. It is recommended that the network controller function (commands to assigned groups, reset, etc.) use a device address of one. In single board systems that combine various functions on the same board as the network controller, (printer ports, video switching, demodulator tuning, etc.) different device addresses should be used for these different logical devices.

The COMMAND field is a single byte indicating which action is to be taken by the logical device specified by DEVICE-ADDR. Thus, a command value of 1 for a demodulator may mean change frequency and a value of 2 may mean mute, while a command value of 1 to a logical printer port may mean send the data contained in the data field to the printer port.

The DATA field is a field of which the interpretation, length, and even existence, may vary depending on the combination of DEVICE-ADDR and COMMAND. Where it does exist, its length may be implied as in the case of a change frequency command, or it may be variable and inferred from the LEN value as with a printer port command.

Finally, CHECKSUM is a one byte value consisting of the logical exclusive OR of all bytes from LEN fields through the DATA field, inclusive. The position of the CHECKSUM byte in the data stream must be inferred from the LEN field, therefore the received LEN value must have good parity before an attempt is made to store and process the incoming command.

From the foregoing, it can be seen that the present invention facilitates control of large numbers of like equipment in a one-way, point to multipoint satellite network, by providing a transmission protocol that is flexible enough to expand to control new equipment types, provide some measure of error detection/correction at low cost and provide extremely fine control with regard to addressability of the remote equipment.

The present invention directly addresses three performance areas in satellite controlled equipment networks. The first performance area is generality. In the present invention, the DEVICE-ADDR field allows for up to 65,535 different types of remote equipment. Each remote equipment can respond to 255 different commands with various amounts of appended data. Moreover, by not pinning down any actual devices, command or data, the protocol allows for the development of generic software drivers for both the uplink and remote sites that is reusable from network to network.

The second performance area is error detection and correction. Various fields in the protocol of the present invention allow different levels of error detection and correction to occur at the remote 16. First, the PARITY and CHECKSUM allow for the easy detection of any single bit error and most combinations of multiple bit errors. If desired, the downlink firmware may elect to simply discard any frame that has any detected error. Further, if the uplink sends each frame out multiple times, incrementing the SEQ-# only when a new frame is transmitted, the downlink could be programmed to discard faulty frames while avoiding the multiple processing and execution of the same frame. This would be important when transmitting printer data, for example.

With only slightly more sophistication, the downlink can be programmed to actually correct any single bit error in a frame. This is accomplished by noting the byte which has a received parity error and then correcting a bit based upon the difference between the received and calculated checksum (exclusive OR). For many systems, this may prove to be an attractive alternative to multiple frame transmission and/or downstream hardware error correction and detection. Other systems may use a combination of all three.

The third performance area of concern is addressability. The present invention is extremely flexible and efficient at addressing remotes because of two primary reasons. The first primary reason is that the remotes are not only groupable, but any remote may belong to any set of groups. It is thus possible to define classes of groups that are completely unrelated to each other. For example, a set of groups may be defined for geographic reasons (50 groups, one for each state), while another set of groups may be set aside to reflect certain classes of service. A remote may then belong to a member of each set and addressed using either (or both) distinctions.

Because the remotes retain their own group membership information, the commands sent from the uplink need only be sent once with the correct group information specified. This is in sharp contrast to addressing systems that require the uplink to determine the list of remotes belonging to a group and then send commands to a list of remotes. The present invention has an obvious efficiency advantage over these other systems.

The second primary reason is that the present invention provides unique flexibility in allowing a combination of addressing modes to be used within one controlled packet. Extremely fine targeting of commands may take place by using boolean operators (logical AND, OR, and NOT).

Suppose, for example, that a network of equipment existed nationally in grocery store chains and that groups had been defined based on geographic location, store chain names, and certain classes of service. If it were desired to have all of the Northwest Big Market stores, for example, except for Ed's Big Market on Highway 5, or any other location that had a Class 2 service designation to perform a certain action, then only a single command is required to be sent from the uplink. The address string specified at the uplink by the operator would be:

"North^West^BigMarket^~EdsBigMarket, Class2".

The uplink computer would then substitute a "G" and the actual corresponding group number for the group names listed and substitute and "S" and the serial number of the equipment for the Ed's Big Market remote in the actual command packet. Only the combination of multiple group membership along with the use of boolean operators allows this fine targeting down to the desired set of end users without having to retransmit the command once for each resultant user in the set.

Still referring to FIG. 4, perhaps the best way to demonstrate the utility of the present invention is to examine its embodiment in the software within the 1800 series receiver manufactured by Wegener Communications Inc. FIG. 4 is thus a diagrammatic block diagram of the 1800 receiver. The 1800 receiver is a microprocessor based receiver that may contain up to five tunable audio or data demodulators 36b. It also contains an RS-232 printer port 36c and five general purpose relay outputs 36a. It is to be noticed that the unit fits into the general purpose remote equipment scheme shown in FIG. 2. Treated this way, general purpose NETCON receiving software can be used with tailoring needed only for the unique attached devices.

In the 1800 receiver, the NETCON device 36n is logical device number 1. The printer port 36c is logical device number 2. The commands it processes are printer data and printer setup. The relays 36a are treated as a single device with device number 3. The single command to this device can set, clear or leave unchanged any of the five relay output. In the 1800 receiver, the relay outputs can be routed back to an audio demodulator to effect a boosting or fading function. The five audio or data demodulators 36b are treated as devices 11 through 15. The commands they respond to are: change frequency (permanent), change frequency (temporary), mute, unmute, and set authorized frequencies.

Figure 5:
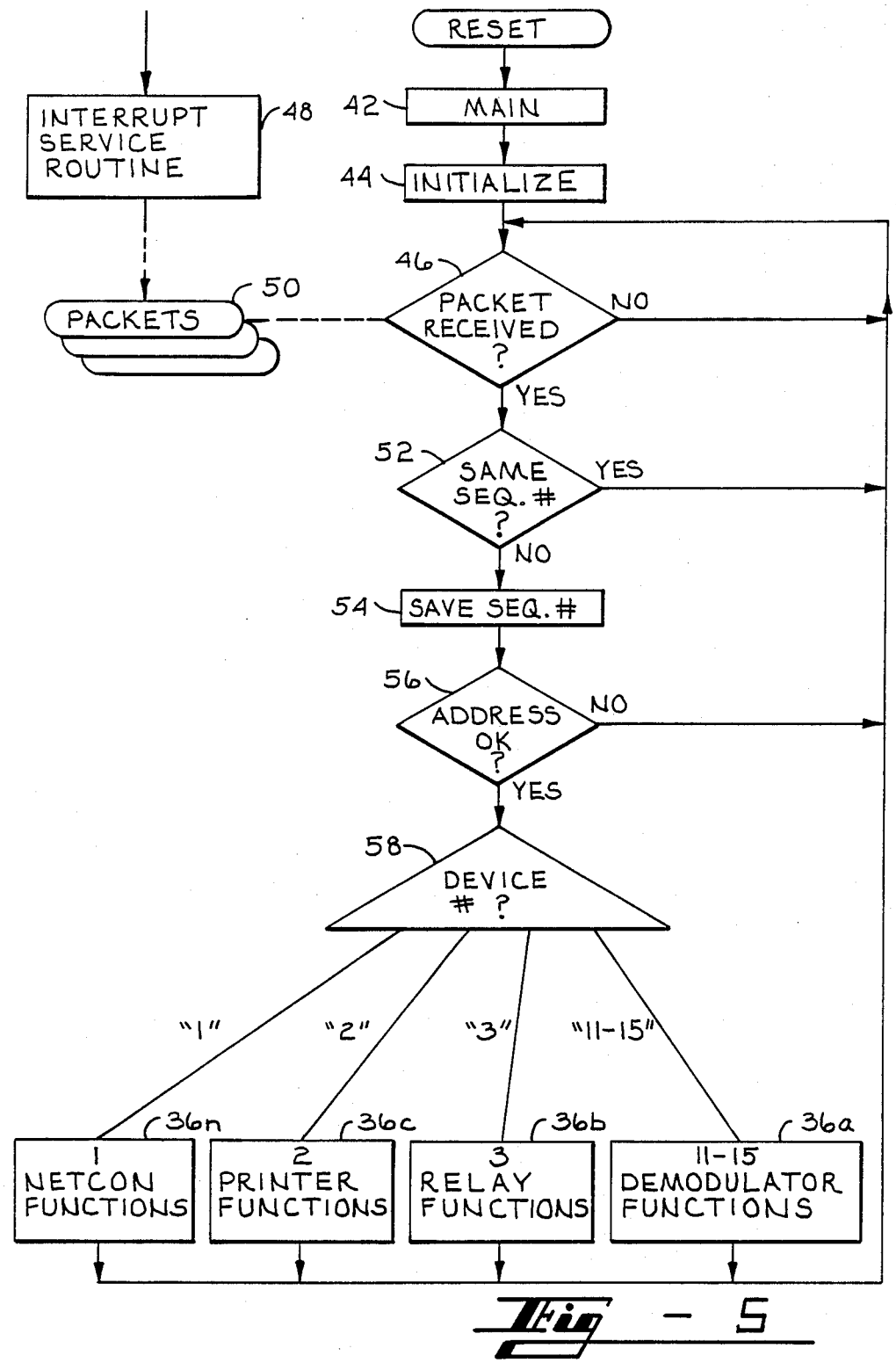
FIG. 5 is a general flow chart for a remote receiver illustrated in FIG. 4.

FIG. 5 shows the overall flow of the 1800 receiver controlled software. From the main program represented by block 42 the hardware and software are initialized at block 44. An interrupt service routine at block 48 controls delivery of packets 50. Decision block 46 is where it is determined whether a packet has been received. If no packet has been received, the process repeats so that the packets are looked for again.

When a packet is received, it is checked at decision block 52 to determine whether it has the same sequence number as the previous packet. If so, the process returns to decision block 46 to determine if another packet has been received. If the sequence numbers are different, the sequence number is saved at block 54 and the address is checked at decision block 56. If the address is not okay, the program again returns to decision block 46. If the address is okay, then the packet is routed to the device 58 for the appropriate functions such as printer functions, relay functions, and demodulation functions. After routing the packet, the program returns to decision 46. In other embodiments of a NETCON based system, only the printer relay and demodulator function blocks need to be replaced with new device drivers. The bulk of the NETCON software remains the same.

Two areas that make the NETCON system unique are error processing and address checking. The majority of the error processing occurs within the interrupt service routine 48. This routine is invoked whenever a new character is available from the UART 34. The interrupt service routine 48 is responsible for detecting frame boundaries, assembling the frame, detecting and correcting errors where possible, and signaling the foreground task when a new packet is available for processing. The algorithm for detecting and correcting errors is described with reference to FIG. 6.

FIG. 6 is a NETCON packet 60 arranged showing different regions A 62, B 64, C 66 and D 68. These regions are of interest to the error processing function. The parity bits are shown in a parity region 70.

Region A is simply the eight VEN-ID and SYSTEM-ID bytes taken as a whole. In the interests of robustness, the software allows up to a one bit error in any of these bytes. If the software is synchronized, it knows which byte to expect. The software then receives and stores the two LEN bytes. If there is a received parity error in either of these bytes, the frame is aborted; that is, the software goes back into a hunt mode looking for the VEN-ID and SYSTEM-ID fields. Thus, while the NETCON protocol is forgiving in an error in the header fields, it is especially sensitive to an error in either LEN byte. This sensitivity is accounted for in the error correction calculations below.

For error correction purposes, the SEQ-#, REMOTE-ADDR, DEVICE-ADDR, COMMAND and DATA fields are lumped together into a region labeled Region C. In FIG. 6, this leaves the checksum as Region D. If the LEN value is received correctly, the software knows how many bytes are in region C and thus where the checksum is. The software proceeds to store each byte in region C as it is received while noting the occurrence and location of any parity error. Also, a running checksum (Exclusive OR) is kept of all bytes received. When the final checksum byte is received, the error correction software makes several decisions based upon the running versus the received checksum and the number and location of any parity errors.

The NETCON protocol allows identification of a bit error on both a horizontal and a vertical basis as viewed in FIG. 6. When a single bit error occurs, its horizontal and vertical coordinates will be identified and the identified bit can be inverted to its original value. The vertical coordinate, that is which byte is corrupted, is known from which byte had the parity error. The horizontal coordinate can be determined from the difference between the received checksum and the calculated checksum. If the two are only one bit different, then that bit position for the corrupted byte had the error.

FIG. 7 is flow chart illustrating an error correction algorithm for the interrupt service routine 48 for the 1800 receiver. The error correction algorithm computes the number of bits difference between the received CHECKSUM and the computed CHECKSUM at block 72. If the number of bits difference is greater than two at decision block 74, the frame is rejected at block 76. If the number of bits difference is less than two, then it is determined at block 78 whether there are more than two PARITY errors. The frame is rejected at block 76 if there are more than two PARITY errors.

If there are less than two bits difference in the CHECKSUMS and less than two PARITY errors, then at block 80 it is determined whether there is a CHECKSUM difference but no PARITY error. If so, the frame is rejected at block 76. By this process uncorrectable frames of data are rejected. Thus, a frame with more than one PARITY error is rejected and a frame with more than one bit difference between the computed and received CHECKSUMS is also rejected. Also, a difference in the CHECKSUMS without a PARITY error is not tolerated.

Frames acceptable to this point are then inspected at block 82. If there is no PARITY error and a CHECKSUM match at block 82, then the frame is acceptable at block 84. If there is a PARITY error or CHECKSUM mismatch at block 82, then it is determined at block 86 whether there is a PARITY error in the received CHECKSUM. If so, the frame is acceptable at block 84. By this process the 1800 receiver ignores cases where the error is just in a PARITY bit or just in the received CHECKSUM.

Finally, if there is a PARITY error or CHECKSUM mismatch from block 82 and the error is not a PARITY error in the received CHECKSUM, then, at block 88, the byte is corrected and the frame is accepted at block 84. At block 88 the byte is corrected and the position is saved within the frame according to: memory (save)=memory (save) XOR difference. The difference is the received checksum XOR'd with the calculated checksum.

The error correction algorithm for the interrupt service routine deals with the error correction phase once all of the frame 40 has been received. Many special cases have to be handled such as a receive error in the checksum byte or a parity error detected with no corresponding checksum error. The effectiveness of an error correcting scheme can be measured by comparing how often a packet will be corrupted at a given bit error rate versus how often it will be corrupted irreparably using error correction under the same conditions. Using a typical satellite bit error rate of one in one million and a typical frame consisting of the address field equalling "G100, S422." and a command that requires ten data bytes, then region C of FIG. 6 is 24 bytes.

Because the total number of bits in a NETBUS transmitted byte is 11 (start bit, 8 data bits, parity bit and stop bit) the total number of bits in the B, C, and D regions of the example are 11 times 27 which equals 297. The chances of receiving a corrupted frame if no error correction is used is then 297 times 1/1,000,000 which is about 0.03 percent.

Unfortunately, an error in certain bits of a NETBUS byte can prove catastrophic; that is, uncorrectable. Any error in the LEN bytes are uncorrectable as is any error in the start and stop bits of a byte. Thus, in our example, 22 bits (two LEN bytes) plus 2 bits/byte times 25 bytes (regions C and D) equals 50 bits for a total of 72 bits that fall in this category. A frame will thus have a probability of being uncorrectable of (72/297 times 297/1,000,000)+((297−72)/297 times the odds of having more than one bit error in correctable region). This later term is negligible compared to the first term since it involves the square and higher powers of the base bit error rate. Thus, the chances of receiving an uncorrectable frame using NETBUS error correction are about 0.0072 percent. This is a four fold improvement over no error correction and does not require any additional hardware.

The ability of the remote unit to detect whether or not to respond to a frame of data, given the complexity and flexibility of the NETBUS REMOTE-ADDR field, is really the nexus of the 1800 addressable receiver.

Figure 8A:
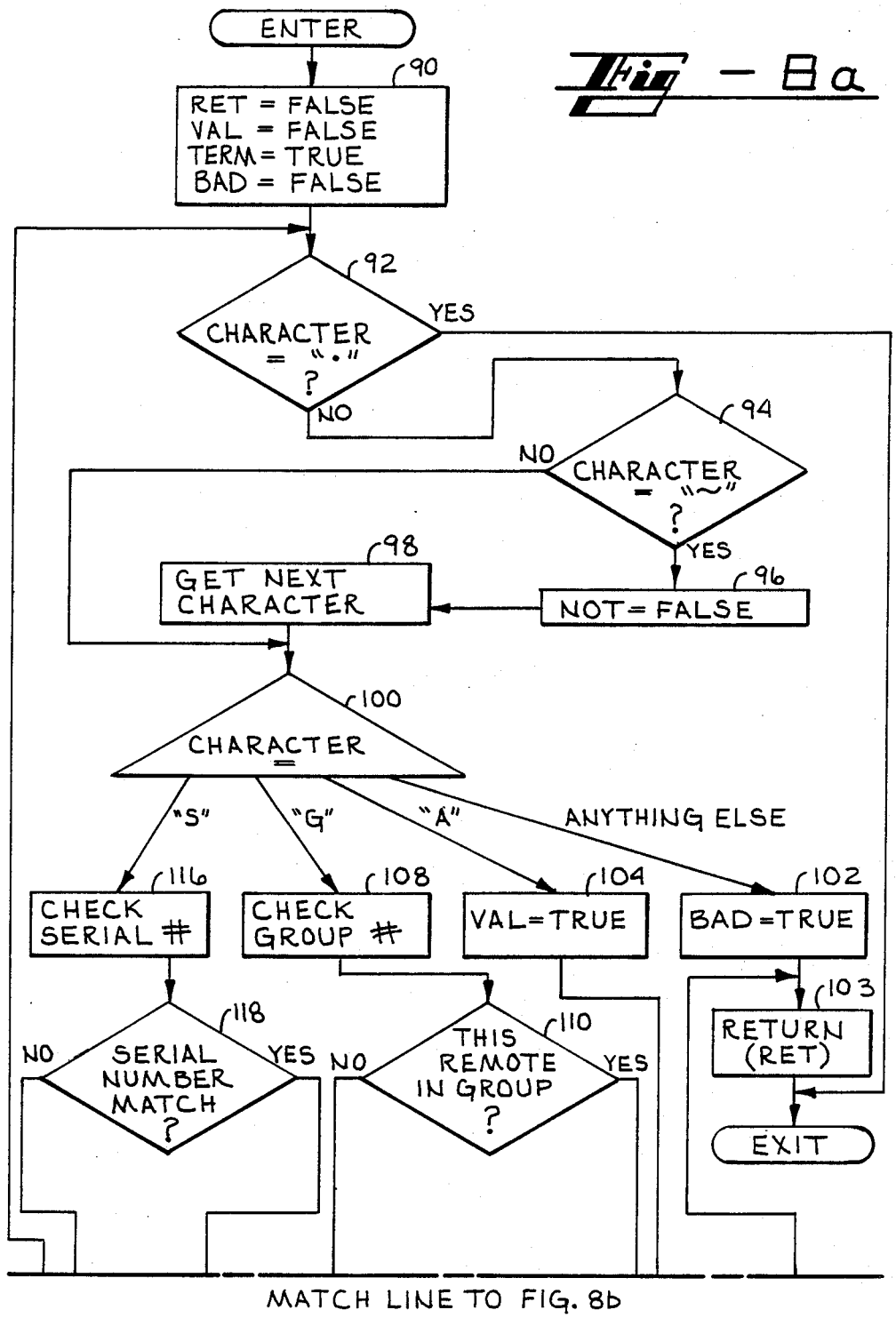
FIGS. 8a and 8b form a flow chart illustrating the address checking routine that is used with the preferred embodiment illustrated in FIG. 4.
Figure 8B:
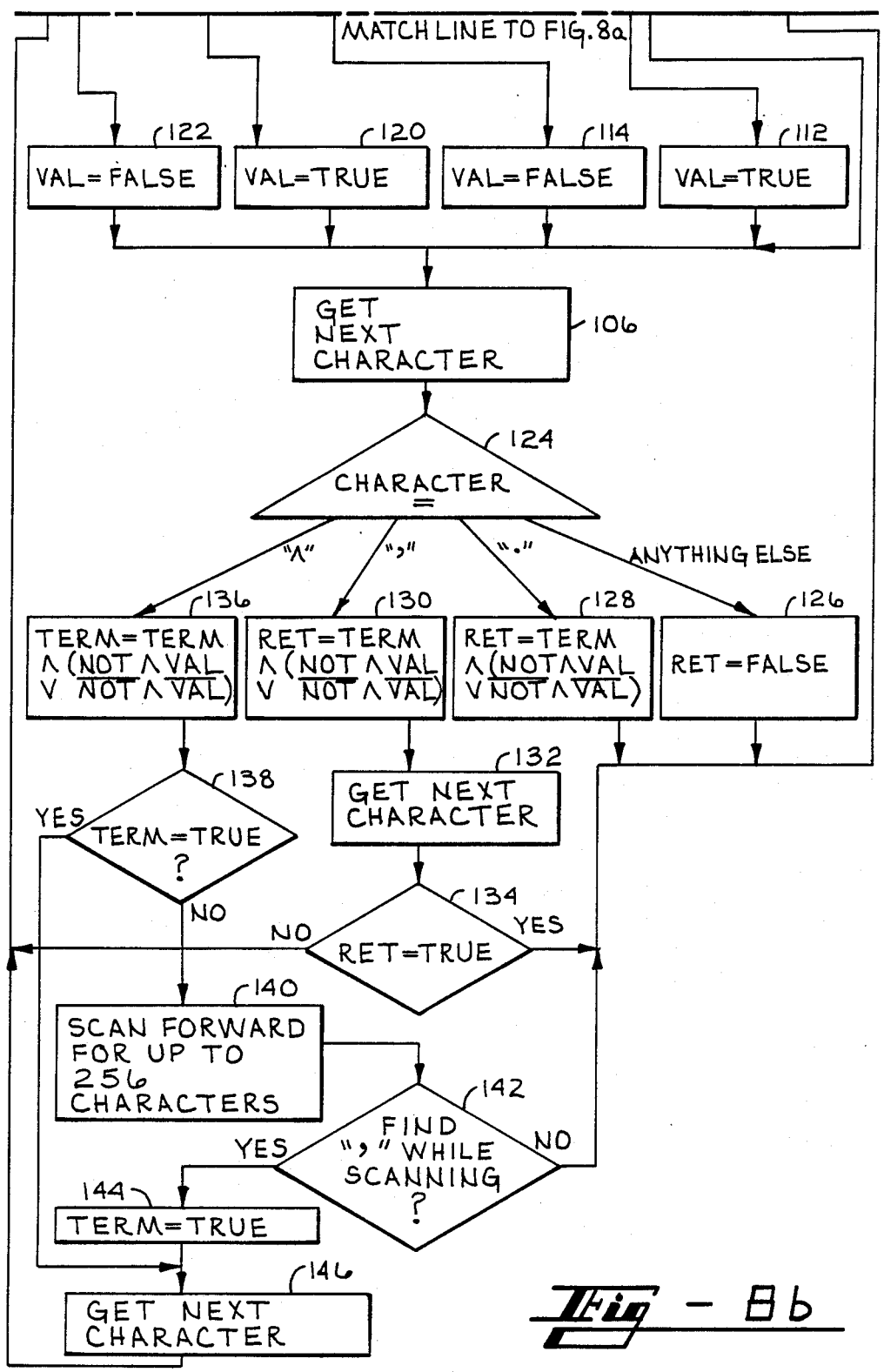

FIGS. 8a and 8b form a flow chart illustrating the address checking routine that is used within the 1800 receiver software. This routine is given REMOTE-ADDR from the data stream and examines the individual, group and all addressing modes possible with the allowed boolean operators. A COMP subroutine is called to compare a received serial number with whatever serial number has been blown into the EPROM of this unit and a group check subroutine is called to determine group membership whenever a received group number is detected. Taken as a whole, these subroutines embody the unique addressability features specified by the NETBUS protocol.

Upon entering the routine, initial parameters are set at block 90 with RET=FALSE, VAL=FALSE, TERM=TRUE and BAD=FALSE. At decision block 92, it is determined whether a character is a ".". If not, the next character is examined at decision block 94. If so, the routine is EXITED because the character "." denotes the end of the entire field.

It is then determined at block 94 whether the character is a "~". If so, then NOT=FALSE at block 96 and the routine advances to block 98 to get the next character and then advances to block 100. The routine also advances from block 94 to block 100 when the character at block 94 is not a "~".

It is determined at decision block 100 whether the character is "S" (individual), "A" (all), "G" (group) or anything else. When the character is anything other than "A", "G" or "S" then at block 102 BAD=True and RETURN (RET) is activated at block 103 causing an EXIT from the routine.

At block 104 VAL=TRUE when the character at block 100 is determined to be an "A". The routine progresses from block 104 to block 106 to get the next character.

When the character at block 100 is a "G", the group number is checked at block 108. Block 110 queries whether the remote unit is in the group identified at block 108. If so, VAL=TRUE at block 112 and the routine advances to block 106 to get the next character. If not, VAL=FALSE at block 114 and the routine advances to get the next character.

When the character at block 100 is an "S", the serial number is checked at block 116. Block 118 queries whether the serial number of the remote unit is the serial number identified at block 116. If so, VAL=TRUE at block 120 and the routine advances to block 106 to get the next character. If not, VAL=FALSE at block 122 and the routine advances to get the next character.

By the process just described it is possible to transmit data via satellite to a single remote unit according to the serial number of the remote unit. It is also possible to transmit data to any group of remote units according to their group number identification. Because each remote unit remembers it's individual and group identifications, each remote only responds to signals intended for it. This frees the transmission computer for other tasks such as scrambling signals, altering frequencies or changing channels to thwart the efforts of pirates and counterfeiters. A counterfeiter, for example, could have a piece of equipment with a receiver and audio modulator tuned to intercept and retrieve certain transmitted signals. With the present invention, the frequency and channels can be switched at will to foil the pirating efforts. The present invention thus provides a measure of security against such efforts.

It will be appreciated that the ability to switch frequencies or channels on an individual basis, on a group basis, or on an "all" basis, at will, and the ability to address a group, except for certain individuals, provides an advanced system with excellent security features. Since a station may be made a part of a group, or groups, licensed stations, whose serial numbers are known, can be made to be in, for example, group A. A command could then be sent for all stations, except group A, to switch to a different channel. The pirate receivers, not being part of group A, would switch to the different channel which would have, for example, noise or a piracy warning.

A pirate receiver with only a tuner and demodulator, but no intelligence (ability to be addressed) could be tuned in to channel 10. The system can then send a command for all (or groups, or individuals) to switch to channel 31, while simultaneously switching the audio and video to channel 31. The intelligent receivers would switch, so the licensed viewers would have uninterrupted viewing. However, the pirate receivers would remain on channel 10, and the pirating user would have to search to find the channel to which the audio and video had been moved. The system can periodically switch channels so as to keep the pirating user constantly searching for the current channel.

The next character, obtained at step 106, is inspected at decision block 124. If the character is not a "∧", "," or ".", then at block 126 RET=FALSE and the routine does an EXIT via block 103. The routine similarly does an EXIT when the character is a "." because at block 128 RET=TERM∧(NOT∧VAL v ∼NOT∧∼VAL).

If the character at block 124 is a ",", then at block 130 RET=TERM∧(NOT∧VAL v ∼NOT∧∼VAL) and the routine proceeds to block 132 to get the next character. At block 134 it is decided whether RET=TRUE. If so, the routine EXITS via block 103. If not, the routine returns to block 92.

If the character at block 124 is a "∧", then at block 136 TERM=TERM∧(NOT∧VAL v ∼NOT∧∼VAL) and the routine proceeds to block 138. At block 138 it is decided whether TERM=TRUE. If not, the routine proceeds to block 140 to scan forward for up to 256 characters. A "," found at block 142 leads to block 144 where TERM=TRUE and the next character is fetched at block 146. The program then returns to the beginning at block 92. The routine EXITS when a "," is not found at block 142 or if a "." is found. A "." denotes the end of an entire field. If TERM=TRUE at block 138, the routine advances to block 146 to get the next character.

It will now be appreciated that there has been presented a remote controlled receiving system for a point to multipoint communications system that facilitates control of large numbers of like equipment.

The protocol is able to tolerate transmission errors in such a way that both the probability of the wrong action taking place at the remote is very low, and the probability of the correct action taking place is very high. This can be referred to as error detection and error correction, respectively.

The protocol is addressable. Referring to the ability of the uplink to direct commands to some set of remotes other than all remotes. Because the uplink is in effect broadcasting every command, all type addressing is trivial. The minimum for an addressable system is the ability to direct a command to an individual remote. Building upon this are various simple and tiered schemes for grouping the remotes. However, most of these schemes rely upon the uplink to remember group membership and simply broadcast a list of individual identifiers with a command when group addressing is desired.

With the present invention, the remotes are not only groupable, but any remote may belong to any set of groups. This is in sharp contrast to previous schemes. With the present invention, it is possible to define classes of groups that are completely unrelated to each other. Moreover, because the remotes themselves retain their own group membership information, the commands sent from the uplink need only be sent once with the correct group information specified. Moreover, channels and frequencies can be switched at will to improve security.

As is evident from the foregoing description, certain aspects of the invention are not limited to the particular details of the examples illustrated, and it is therefore contemplated that other modifications or applications will occur to those skilled in the art. For example, while the invention has been described in detail for a downlink with a model 1800 receiver, it is apparent that the same structure may be equally applicable to other downlinks. It is accordingly intended that the claims shall cover all such modifications and applications that do not depart from the true spirit and scope of the invention.

I claim:

1. A remote controlled receiving system having a plurality of remote receivers for receiving transmitted digital signals, each remote receiver comprising:
   means for reassembling transmitted bytes of data;
   a microprocessor for interpreting said reassembled bytes of data according to a predefined protocol to define a desired action; and
   an output device connected to said microprocessor; wherein said microprocessor causes said desired action to be executed by affecting said output device.

2. The system of claim 1 wherein said predefined protocol provides for transmitted data to be formatted into at least one frame containing a plurality of data fields.

3. The system of claim 2 wherein said frame has a minimum length of seventeen data bytes.

4. The system of claim 3 wherein said frame has a maximum length of two hundred fifty data bytes.

5. The system of claim 2 wherein said frame contains a remote address field that is variable in length and specifies which of said remote receivers is to process said transmitted signal.

6. The system of claim 2 wherein said frame contains a data field that is variable in length.

7. The system of claim 2 wherein said frame contains a checksum field that is a one byte value consisting of the logical exclusive OR of all bytes from a length indicator field, sequence number field, remote address field, device address field, command field and data field.

8. The system of claim 2 including means for detecting that a byte was received with a parity error and correcting a single bit error in said frame of data based upon a difference between a received checksum and a calculated checksum.

9. The system of claim 2 wherein said frame contains a vendor identification field and a system identification field, each containing a preselected number of data bytes, and wherein said remote receiver enters a hunt phase wherein said remote receiver searches for bytes that form said system identification field and said vendor identification field.

10. The system of claim 9 wherein said remote receiver does not exit said hunt phase unless the received byte is more than one bit different than expected.

11. The system of claim 10 wherein said frame contains a two byte length indicator field that specifies the number of bytes in a sequence number field, remote address field, device address field, command field and data field, and wherein any reception error in said length indicator field aborts said frame and causes said remote receiver to reenter said hunt phase.

12. A method for detecting and correcting errors in received data in a remote controlled receiving system having a plurality of remote receivers for receiving transmitted data, comprising:
  determining whether a data packet has been received;
  checking a received data packet and determining whether said received data packet has a unique sequence number;
  saving said unique sequence number of said received data packet;
  checking the address of said received data packet; and
  routing said received data packet to a special device when said checked address is acceptable.

13. The method of claim 12 wherein determining whether a data packet has been received includes:
  computing the number of bits difference between a received checksum and a calculated checksum;
  rejecting an uncorrectable frame based upon said computation; and
  ignoring instances where an error is simply a parity bit error or simply an error in the received checksum.

14. The method of claim 13 wherein a frame is uncorrectable when the number of bits difference exceeds two or there is more than one parity error or the number of bits difference exceeds zero but not more than one and there are zero parity errors.

15. The method of claim 12 wherein checking the address of said received data packet includes examining any received "individual", "group", and "all" designations, in conjuction with any received boolean operators.

16. The method of claim 12 wherein checking the address of said received data packet includes comparing a received serial number with a preselected serial number.

17. The method of claim 12 wherein checking the address of said received data packet includes detecting a group number and determining group membership.

18. A receiving system, comprising:
  a receiving antenna adapted to receive transmitted signals that are variable in frequency or channel allocation;
  a device coupled to said receiving antenna and adapted to recover transmitted signals received via said receiving antenna that have a preselected frequency or channel allocation;
  means, coupled to said receiving antenna and said device, for selectively responding to said variable frequency or channel allocation;
  means for determining whether a transmitted data packet has been received;
  means for checking a received data packet and determining whether said received data packet has a unique sequence number;
  means for saving said unique sequence number of said received data packet;
  means for checking the address of said received data packet; and
  means for routing said received data packet to a said device when said checked address is acceptable.

19. The method of claim 18 wherein checking the address of said received data packet includes examining any received "individual", "group", and "all" designations, in conjunction with any received boolean operators.

20. A receiving system, comprising;
  a receiving antenna adapted to receive transmitted signals that are variable in frequency or channel allocation;
  a device coupled to said receiving antenna and adapted to recover transmitted signals received via said receiving antenna that have a preselected frequency or channel allocation;
  means, coupled to said receiving antenna and said device, for selectively responding to said variable frequency or channel allocation;
  means for computing the number of bits difference between a received checksum and a calculated checksum;
  means for rejecting an uncorrectable frame based upon said computation, said frame being uncorrectable when the number of bits difference exceeds one, there is more than one parity error, or the number of bits difference exceeds zero but not more than one and there are zero parity errors; and
  means for ignoring instances where an error is simply a parity bit error or simply an error in the received checksum.

* * * * *